United States Patent [19]

Okamoto

[11] Patent Number: 5,568,180
[45] Date of Patent: Oct. 22, 1996

[54] VIDEO-ON-DEMAND SYSTEM OF REDUCED STORAGE CAPACITY WHICH CAN PROVIDE NONINTERRUPTED BROADCAST TO A PLURALITY OF USERS

[75] Inventor: Tadashi Okamoto, Osaka, Japan

[73] Assignee: Matsushita Electric Industrial Co., Ltd, Osaka, Japan

[21] Appl. No.: 418,584

[22] Filed: Apr. 6, 1995

[30] Foreign Application Priority Data

Apr. 11, 1994 [JP] Japan .................. 6-072224

[51] Int. Cl.⁶ .................. H04N 7/173
[52] U.S. Cl. .................. 348/7; 348/12; 348/13; 455/5.1; 455/41
[58] Field of Search .................. 348/7, 13, 12; 455/5.1, 31, 41, 4.2

[56] References Cited

U.S. PATENT DOCUMENTS

| | | | |
|---|---|---|---|
| 5,414,837 | 5/1995 | Kotatsu | 348/7 X |
| 5,442,389 | 8/1995 | Blahet et al. | 348/7 |
| 5,442,390 | 8/1995 | Hooper et al. | 348/7 |
| 5,453,779 | 9/1995 | Dan et al. | 348/7 |

FOREIGN PATENT DOCUMENTS 239337  2/1990  Japan .

*Primary Examiner*—Victor R. Kostak
*Assistant Examiner*—Nathan J. Flynn
*Attorney, Agent, or Firm*—Price, Gess & Ubell

[57] ABSTRACT

The present invention is a video-on-demand system, comprising an image data storage device, including a plurality of recording media, which stores image data for a plurality of programs divided into a plurality of blocks which are distributed among all of the recording media, an image data management device, including image data management tables in which management information for the image data is stored, which consults the image data management tables and transmits necessary information separately for each block, when there is a request from outside the device for information about one of the programs, these image data management tables including a title table corresponding a title of each of the programs with starting block identification information for each, a block table corresponding block identification information for each of the blocks with starting frame identification information for each block, and a frame table corresponding frame identification information for each frame with position information showing at which position on which recording medium out of the recording media each of the frames is stored, and an image data transmission device which requests to the image data management device for the necessary information for a transmission of a program requested by a user, receives the necessary information from the image data management device, retrieves image block data separately for each block from the recording media and transmits the image block data to the user.

28 Claims, 13 Drawing Sheets

Fig. 2A PRIOR ART

121 TITLE TABLE

| TITLE A | TITLE B | TITLE C | TITLE D | TITLE E | ----- |

122 FRAME TABLE

| A1 | B1 | C1 | D1 |
| A2 | B2 | C2 | D2 |
| A3 | B3 | C3 | D3 |
| A4 | B4 | C4 | D4 |
| | | | |
| A7200 | B7200 | C7200 | D7200 |

124 TITLE A FRAME INFORMATION

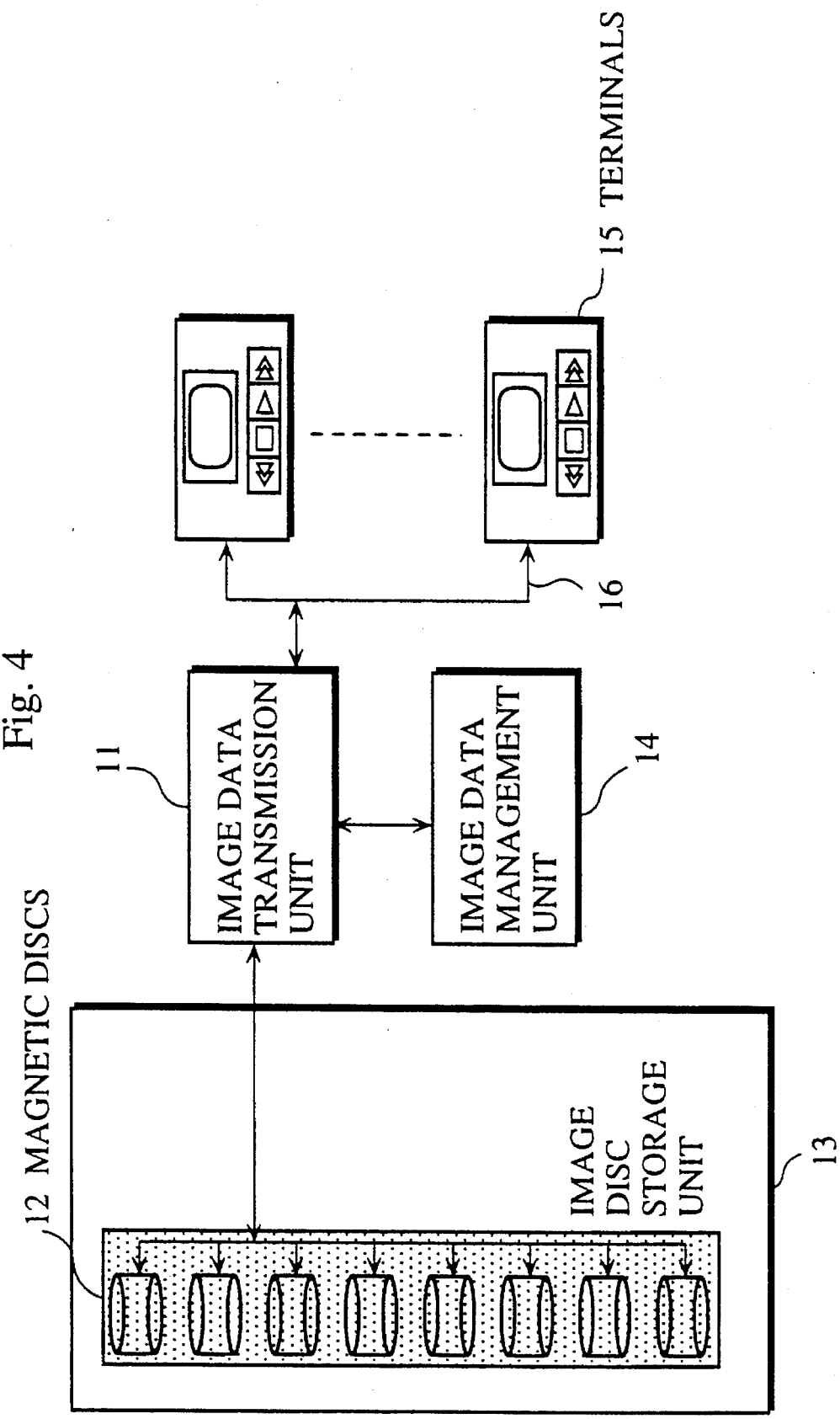

Fig. 5A 210 TITLE TABLE

| TITLE A | TITLE B | TITLE C | TITLE D | TITLE E |
|---------|---------|---------|---------|---------|

211 TITLE INFORMATION FOR PROGRAM A

Fig. 5B 220 BLOCK TABLE (ONLY BLOCK TABLE FOR PROGRAM A SHOWN)

| A1 | A2 | A3 | A4 | ------ | A8 |
|----|----|----|----|--------|----|

221 BLOCK TABLE ENTRY FOR PROGRAM A

Fig. 5C 230 FRAME TABLE (ONLY FRAME TABLE COLUMNS FOR BLOCKS IN PROGRAM A SHOWN)

| A1-1 | A2-1 | A3-1 | A4-1 | A8-1 |
|------|------|------|------|------|
| A1-2 | A2-2 | A3-2 | A4-2 | A8-2 |
| A1-3 | A2-3 | A3-3 | A4-3 | A8-3 |
| A1-4 | A2-4 | A3-4 | A4-4 | A8-4 |
| A1-5 | A2-5 | A3-5 | A4-5 | A8-5 |
| A1-6 | A2-6 | A3-6 | A4-6 | A8-6 |
| ... | ... | ... | ... | ... |
| A1-900 | A2-900 | A3-900 | A4-900 | A8-900 |

231 FRAME TABLE COLUMN FOR BLOCK 1 OF PROGRAM A
232 FRAME TABLE COLUMN FOR BLOCK 2 OF PROGRAM A

Fig. 9A

211 TITLE INFORMATION FOR PROGRAM A — 210 TITLE TABLE

| TITLE A | TITLE B | TITLE C | TITLE D | TITLE E |
|---------|---------|---------|---------|---------|

Fig. 9B

221 BLOCK TABLE ENTRY FOR PROGRAM A

611 BLOCK IDENTIFICATION INFORMATION FOR COPY (BLOCK 9) OF BLOCK 2 OF PROGRAM A

610 BLOCK TABLE (ONLY BLOCK TABLE ENTRY FOR PROGRAM A SHOWN)

| A1 | A2 | A3 | ----- | A8 | A2'(COPY OF A2) |
|----|----|----|-------|----|-----------------|

620 FRAME TABLE (ONLY FRAME TABLE COLUMNS FOR BLOCKS IN PROGRAM A SHOWN)

231 FRAME TABLE COLUMN FOR BLOCK 1 OF PROGRAM A

232 FRAME TABLE COLUMN FOR BLOCK 2 OF PROGRAM A

621 FRAME TABLE COLUMN FOR COPY OF BLOCK 2 OF PROGRAM A

| A1-1 | A2-1 | A3-1 | A8-1 | A2'-1 |
|------|------|------|------|-------|
| A1-2 | A2-2 | A3-2 | A8-2 | A2'-2 |
| A1-3 | A2-3 | A3-3 | A8-3 | A2'-3 |
| A1-4 | A2-4 | A3-4 | A8-4 | A2'-4 |
| A1-5 | A2-5 | A3-5 | A8-5 | A2'-5 |
| A1-6 | A2-6 | A3-6 | A8-6 | A2'-6 |
| ... | ... | ... | ... | ... |
| A1-900 | A2-900 | A3-900 | A8-900 | A2'-900 |

POSSIBILITY FOR ADVANCE DUE TO
FAST FORWARD OPERATION

MID-VIEWING

720 SCHEDULING TABLE

|  | | | | | | | | |
|---|---|---|---|---|---|---|---|---|
| USER 1 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |
| USER 2 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |
| USER 3 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |
| USER 4 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |
| USER 5 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |
| USER 6 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |
| USER 7 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |

POSSIBILITY OF RETURN DUE
TO REWIND OPERATION

MID-VIEWING

POSSIBILITY OF ADVANCE DUE
TO FAST FORWARD OPERATION

720

|  | | | | | | | | |
|---|---|---|---|---|---|---|---|---|
| USER 1 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |
| USER 2 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |
| USER 3 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |
| USER 4 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |
| USER 5 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |
| USER 6 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |
| USER 7 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |

720 SCHEDULING TABLE

| | | | | | | | | |
|---|---|---|---|---|---|---|---|---|
| USER 1 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |
| USER 2 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |
| USER 3 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |
| USER 4 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |
| USER 5 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |
| USER 6 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |
| USER 7 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |
| USER 8 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |

FAST FORWARD →

Fig. 12B

720 SCHEDULING TABLE

| | | | | | | | | |
|---|---|---|---|---|---|---|---|---|
| USER 1 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |
| USER 2 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |
| ⋮ | | | | | | | | |
| USER 6 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |
| USER 7 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |
| USER 8 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |
| ⋮ | | | | | | | | |
| USER 12 | TITLE A BLK1 | TITLE A BLK2 | TITLE A BLK3 | TITLE A BLK4 | TITLE A BLK5 | TITLE A BLK6 | TITLE A BLK7 | TITLE A BLK8 |
| USER 13 | TITLE A BLK1 | TITLE A BLK9 | TITLE A BLK3 | TITLE A BLK4 | TITLE A BLK5 | TITLE A BLK6 | TITLE A BLK7 | TITLE A BLK8 |

FAST FORWARD →

VIDEO-ON-DEMAND SYSTEM OF REDUCED STORAGE CAPACITY WHICH CAN PROVIDE NONINTERRUPTED BROADCAST TO A PLURALITY OF USERS

BACKGROUND OF THE INVENTION

1. Field of the Invention

The present invention relates to a video-on-demand system for the supply of audio-visual programs via a cable network in accordance with user requests from a number of users and the method for the management of image data used therein.

2. Description of the Related Art

Recent years have witnessed the spread of CATV systems in a number of countries, with the principle format for the supply of programs being a pay-by-view system wherein the user can watch programs, such as movies or whatever, which are broadcast at a scheduled time. There have also been advances in the possibilities for two-way communication between the user and the cable network which broadcasts the program, so that there have been experiments using systems wherein the user can manipulate the program broadcast on a cable network using the same functions (rewind, fast forward, slow motion) which would be available if he/she were watching the program reproduced by a VCR. However, such techniques are still at a developmental stage, so that the functions present for VCRs have not yet been realized for CATV systems, and for the time being, an improved system for gathering information about users' desired viewing and a control method for such a system are necessary.

The following is an explanation of a video-on-demand system constructed according to present techniques, and the image data control method used therein, with reference to the drawings.

FIG. 1 shows a construction of a video-on-demand system according to the prior art. This video-on-demand system includes an image data transmission unit 111 for transmitting image data to the user, an image data storage unit 112 for storing the image data, usually composed of magnetic discs 113, and an image data management unit 114 for managing the storage information for the image data storage unit 112 and the information about the users, and is connected via a cable network 116 to the users' terminals 115.

FIGS. 2A and 2B show the image management tables for managing the image data in the image data management unit 114 in the video-on-demand system constructed according to the prior art, which was shown in FIG. 1.

These image management tables are comprised of a title table 121 and a frame table 122. The title table 121 stores all of the titles of the programs stored in the image data storage unit 112 together with the first address of the frame information for each title in the frame table 122.

The programs (image data) in the image data storage unit 112 are managed in a format divided into areas of a fixed length.

The frame table 122 stores for every frame the storage position (address) in the image data storage unit 112 of the first address of the image data (frames) divided into areas of fixed length. For example, the program indicated by the title information 123 for title A (program A) in the title table 121 is divided into A1, A2, A3, A4, . . . A7200 as shown in the frame information 124 for program A in the frame table 122.

On receiving a request of the title of the program which a user wishes to view from the terminal 115, the image data transmission unit 111 requests the appropriate title information in the title table 121 from the image data management unit 114. Having obtained the necessary title information, the image data transmission unit 111 requests from the image data management unit 114 the frame information corresponding to the title of the program, for example, frame information 124 for program A, out of the frame table 122, by reading the first address for the frame information 124. Having obtained the necessary frame information 124 out of the frame table 122, the image data transmission unit 11 stores this frame information 124, and accesses the address corresponding to the title of the program in the image data storage unit 112, thereby requesting the image data. Having obtained the image data, it then transmits the image data via the cable network 116 to the user's terminal 115.

The following is an explanation of the operation of the video-on-demand system constructed as described above.

FIG. 3 is a drawing showing the transmission process for the image data for the video-on-demand system of the prior art shown in FIG. 1, including the interaction with the user. The areas enclosed by broken lines show the operations performed by the image data transmission unit 111, the image data storage unit 112, the image data management unit 114, and the user's terminal 115, respectively.

The user accesses the image data transmission unit 111 using the terminal 115 via the cable network 116, and requests the program to be viewed, for example, program A (step 1302). The image data transmission unit 111 then requests the title information 123 for program A in the title table 121 from the image data management unit 114 (S1304). The image data management unit 114 then transmits the program A title information 123 in the title table 121 to the image data transmission unit 111 (S1306), when the program requested by the user is A. The image data transmission unit 111 obtains this program A title information 123 and accesses the address in given in the program A title information 123 from the image data management unit 114, before requesting the frame information 124 which corresponds to program A in the frame table 122 (S1308). The image data management unit 114 then transmits the requested frame information 124 (S1310). The image data transmission unit 111 obtains this frame information 124 from the image data management unit 114, and stores this frame information 124 (S1312). The image data transmission unit 111 then successively accesses the addresses on the magnetic disc 113 in the image data storage unit 112 given in frames A1 through A7200 in said frame information 124 (S1314). The image data storage unit 112 then transmits the accessed image data (S1316). In this way, the image data transmission unit 111 obtains the necessary image data from the image data storage unit 112 (S1318). The image data transmission unit 111 then transmits the obtained image data to the user's terminal 115 (S1320). The transmitted image data is then televised using the terminal 115 (S1322). The user watches the televised image, and may make use of the same operations (rewind, play, fast forward) as with a VCR (S1324). The image data transmission unit 111 then judges whether such a VCR operation has been made (S1326) and, if there has been such an operation, receives the operation, returns to step S1314, and has the image televised according to the wishes of the user (S1314–S1322). If there has not been a VCR operation, then the image data transmission unit 111 checks whether the final frame has already been transmitted (S1328), repeating the process in steps S1314–S1326 when the program has not finished, and moving on to step S1330 when it has. Having transmitted all of the image data, the image data transmission unit 111 then executes a postcompletion process (S1330), for example, a fee-charging process.

For video-on-demand systems under the prior art, there have been no problems so long as programs are sent to the users at a fixed speed, but, when using such program supplying techniques, if there are a number of users watching the same program at the same time, all watching the same part of the program repeatedly by rewinding and fast forwarding, then there is the possibility that the system will be unable to send the image data to the user uninterruptedly. The same problems may occur if there are a number of titles stored on the same recording medium.

The situation described below can be thought of as a typical example. When magnetic discs 113 are installed in the image data storage unit 112, then if the average retrieval rate is 2 MBytes/second and the necessary transfer rate for transmitting image data to 1 user is set at 256 KBytes/second, then this means that a total of around 8 users can view images from one magnetic disc 113. If 10 magnetic discs 113 are arranged in parallel, then, if the load is shared effectively, a total of 8×10=80 users can be served. Therefore, if the requesting of a title by the users is performed at a predetermined fixed interval, then the video-on-demand system can commence the transmission of the image data. However, if after a given time, all 80 users make use of operations such as fast forward or rewind which all concern the images stored on 1 disc out of the magnetic discs 113, then, since the image data storage unit 112 can only transfer the data for 8 users, there will be a breakdown in the transmission of image data to the users' terminals 115, and the normal transmission of image data will no longer be possible.

Also, since it is necessary for the image data transmission unit 111 to store all of the frame information for the programs requested by the users, then it is necessary to equip the image data transmission unit 111 with a large storage capacity.

SUMMARY OF THE INVENTION

A first object of the present invention is to provide a video-on-demand system with an image data transmission unit of reduced storage capacity.

It is another object of the present invention to provide a video-on-demand system and a method for the management of image data which can televise programs without interruptions, even when a number of users all request the televising of a same part of a same program.

The first object stated above can be achieved by a video-on-demand system, comprising: an image data storage device, including a plurality of recording media for storing a plurality of programs, for storing image data for the programs divided into a plurality of blocks which are distributed among all of the recording media; an image data management device, including image data management tables in which management information for the image data is stored, for consulting the image data management tables and transmitting necessary information separately for each block, when there is a request from outside the device for information about one of the programs, wherein the image data management tables comprise a title table to a title of each of the programs with starting block identification in, formation for each of the programs, a block table corresponding block identification information for each of the blocks with starting frame identification information for each of the blocks, and a frame table corresponding frame identification information for each frame with position information showing at which position on which recording medium out of the recording media each of the frames is stored; and an image data transmission device for requesting to the image data management device for the necessary information for a transmission of a program requested by a user, for receiving the necessary information from the image data management device, for retrieving image block data separately for each block from the recording media and for transmitting the image block data to the user.

By means of the construction described above, it becomes possible to have the image data for a number of programs handled in sections.

Also, the number of the recording media disposed in the image data storage device lay be equal to or above a number of the blocks of image data in one program.

Also, the image data transmission device may include: a request unit for receiving a request for a televising of one of the programs from the user, and requesting to the image data management device a transmission of storage position information which shows at which position on which recording medium each separate block in the program is stored; an image data retrieval/transmission unit for receiving the transmission of the storage position information for each separate block of the program from the image data management device, for retrieving the image block data for each separate block from the position designated by the storage position information on the recording medium designated by the storage position information, and transmitting the image block data to the user; a request continuation unit for requesting to the image data management device, when the image data retrieval/transmission unit has finished retrieving the image block data for one block, a transmission of storage position information of image block data for a next block following after the block for which retrieving is finished; and an image data retrieval/transmission continuation unit for receiving the transmission of the storage position information of the image block data for the next block from image data management device, for retrieving the image block data for the next block from a position designated by the storage position information on a recording medium designated by the storage position information, and transmitting the image block data to the user, wherein the image data management device may include: a first request processing unit for receiving a transmission request for the storage position information for the image block data for each separate block from the request unit, for consulting the image data management tables and for transmitting the storage position information as to in which position on which recording medium the image block data is stored to the image data retrieval/transmission unit; and a second request processing unit for receiving a transmission request for the storage position information for the image block data from the request continuation unit, for consulting the image data management tables and transmitting the storage position information for the image block data to the image data retrieval/transmission continuation unit.

The request unit may include: a title information request unit for receiving an indication of a program name from the user and for requesting title information for the program name from the first request processing unit a first block identification information request unit for receiving the title information, for consulting the title information and for requesting the starting first block identification information from the first request processing unit; a first frame table request unit for receiving the starting block identification information, for consulting the starting block identification information and requesting a frame table column specified in the starting block identification information from the first request processing unit; a first frame table storage unit for storing the frame table column; a second block identification information request unit for consulting, once one of the image data retrieval transmission unit and the image data retrieval transmission continuation unit has completed retrieving the image block data of one block, the block identification information of a completed block and requesting new block identification information for the next block from the second request processing unit; a second frame table request unit for receiving the new block identification information, for consulting the new block identification information and requesting a new frame table column from the second request processing unit; and a second frame table storage unit for storing the new frame table column, wherein the first request processing unit includes: a title information transmission unit for receiving a request from the title information request unit, for consulting the title table, and transmitting the title information corresponding to the program to the first block identification information request unit; a first block identification information transmission unit for receiving a request from the first block identification information request unit, for consulting the block table and for transmitting the starting block identification information to the first frame table request unit; and a first frame table transmission unit for receiving a request from the first frame table request unit, for consulting the frame table and for transmitting to the first frame table memory unit the frame table column for an indicated starting block, and wherein the second request processing unit includes: a second block identification information transmission unit for receiving a request from the second block identification information request unit, for consulting the block table and for transmitting the block identification information for the next block to the second frame table request unit; and a second frame table transmission unit for receiving a request from the second frame table request unit, for consulting the frame table and for transmitting to the second frame table memory unit the new frame table column for the next block.

The other object described above may be fulfilled by the video-on-demand system wherein the image data management device may further include: a number of users storage unit for storing a number of users who are simultaneously viewing blocks having a same block number in any of the programs; an image data transmission possibility judgement unit for judging whether the number of users for a starting block recorded in the number of users storage unit is within a range for which uninterrupted transmission of the image data is possible; and a block identification information transmission cancellation indication unit for giving an indication to the first block identification in,formation transmission unit to cancel transmission of the starting block identification information, when the image data transmission possibility judgement unit judges that the transmission is not possible.

By means of the above construction, when the user first requests the televising of a program, since the number of users for whom the uninterrupted transmission of image data is possible is limited, then the system can televise the requested program without interruptions.

Also, the number of users storage unit may update the number of users viewing a block, when the block identification information of the block is transmitted by one of the first block identification information transmission unit and the second block identification information transmission unit, and when one of the image data retrieval/transmission unit and the image data retrieval/transmission continuation unit has finished retrieving the image block data for one block.

The image data transmission possibility judgement unit may include: a number of users retrieval unit for retrieving the number of users for each block from the number of users storage unit; a maximum number of transmissions calculator for calculating a maximum number of transmissions which is a value given by dividing an average retrieval rate for the image data from the image data storage device by the image data retrieval/transmission unit by a transfer rate for a transfer of the image data to the user and subtracting a constant; and a possibility judgement unit for judging that the transmission is not possible when the number of users of the starting block, retrieved by the number of users retrieval unit, is equal to or above the maximum number of transmissions calculated by the maximum number of transmissions calculator.

The image data management device may further include: a schedule storage unit for storing programs being viewed in terms of each separate block unit for each user; and a copy indication unit for giving an indication, when the number of users viewing a given block retrieved by the number of users retrieval unit becomes equal to the maximum number of transmissions calculated by the maximum number of transmissions calculator, and, in the schedule storage unit, a program for a block which is one of a block preceding and following the given block coincides with one of the programs for the given block, to the image data storage device to copy image block data for the given block in the coinciding program, wherein the image data storage device may include a reserve image data storage unit, comprising a reserve recording medium separate from the recording media, for copying image data onto the reserve recording medium at the indication from the copy indication unit.

The image data management device may further include: an image data management table writing unit for writing new block identification information and a new frame table column corresponding to the image data copied by the reserve image data storage unit into the block table and the frame table in the image data management tables; and a number of users addition storage unit, which provides a storage column corresponding to a new block in the reserve image data storage unit to the number of users storage unit aside from storage columns for storing the number of users, for adding and storing the number of users viewing a block in a corresponding storage column.

Also, after the reserve image data storage unit has notified the image data management device that it has finished copying the image block data onto the reserve recording medium, then when there has been a request for a frame table column corresponding to the image block data, from one of the first frame table request unit and the second frame table request unit, then one of the first frame table transmission unit and the second frame table transmission unit may transmit the frame table column newly written in by the image data management table writing unit.

BRIEF DESCRIPTION OF THE DRAWINGS

These and other objects, advantages and features of the invention will become apparent from the following description taken in conjunction with the accompanying drawings which illustrate a specific embodiment of the invention. In the drawings:

FIG. 2A is a drawing showing an example of the title table under the prior art;

FIG. 2B is a drawing showing an example of the frame table under the prior art;

FIG. 4 is a construction of a video-on-demand system according to the first embodiment of the present invention;

FIG. 5A is an example of the title table under the present embodiment;

FIG. 5B is an example of the block table under the present embodiment;

FIG. 5C is an example of the frame table under the present embodiment;

FIG. 9A is an example of the title table under the second embodiment;

FIG. 9B is an example of the block table under the second embodiment;

FIG. 9C is an example of the frame table under the second embodiment;

FIG. 11A is an example of the scheduling table under the second embodiment;

FIG. 11B is an example of the scheduling table under the second embodiment;

FIG. 12A is an example of the scheduling table under the second embodiment;

FIG. 12B is an example of the scheduling table under the second embodiment; and

DESCRIPTION OF THE PREFERRED EMBODIMENTS

Figure 1:
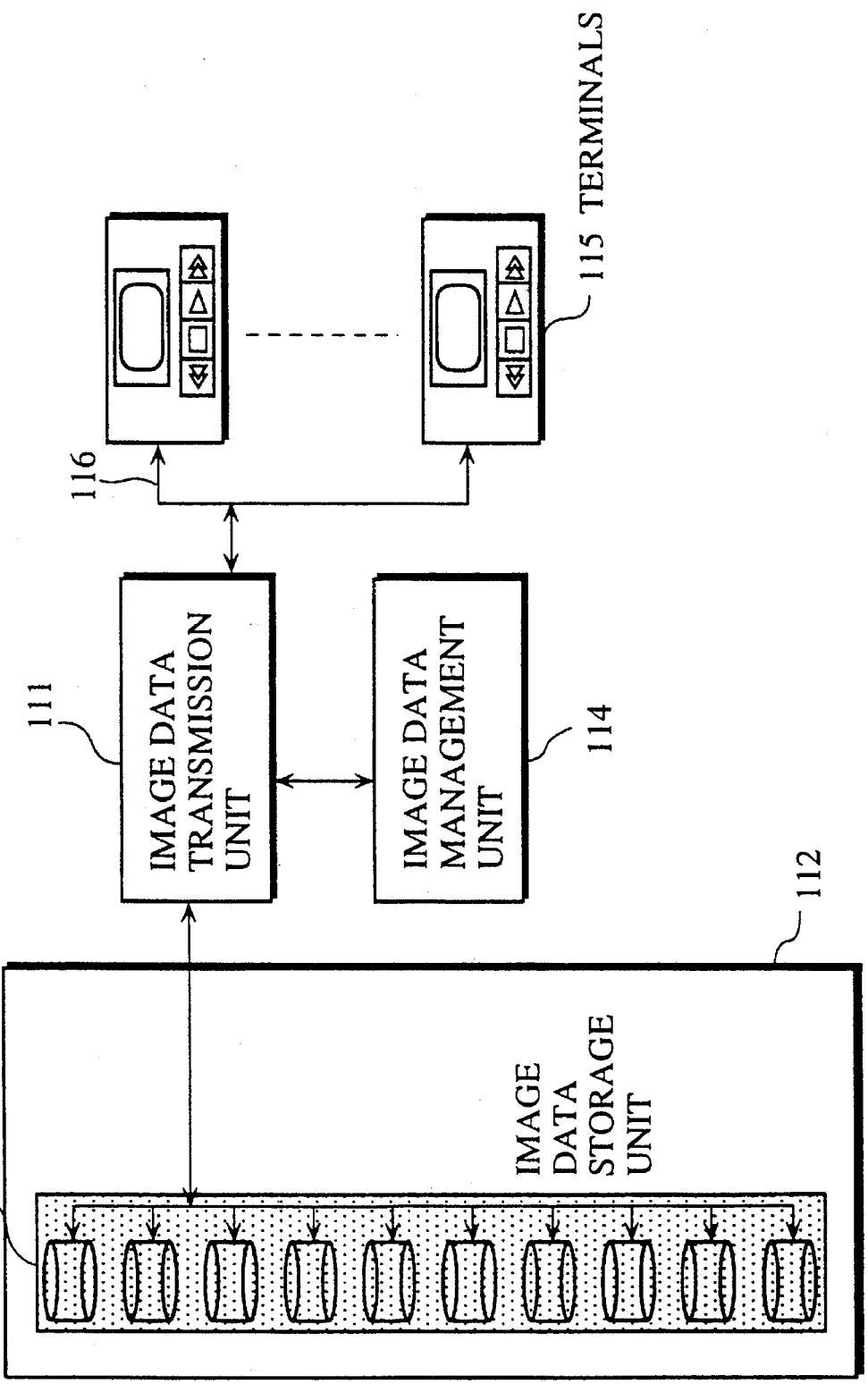
FIG. 1 is a construction of a video-on-demand system according to the prior art.
Figure 3:
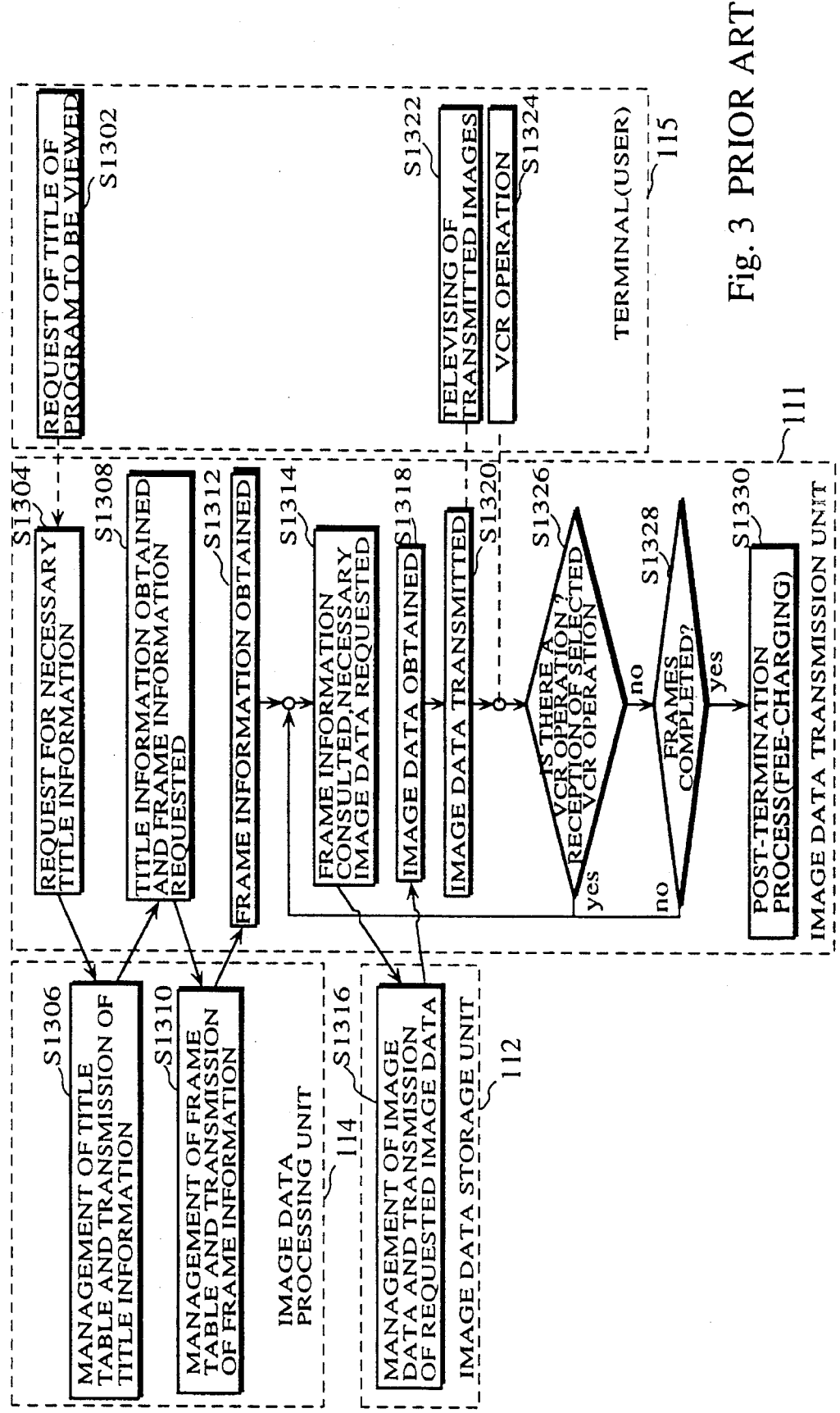
FIG. 3 is a drawing showing the operation of an example of the prior art.

The following is a description of the preferred embodiments of the present invention.

First Embodiment

FIG. 4 is a construction of a video-on-demand system according to the first embodiment of the present invention. The video-on-demand system of the first embodiment includes an image data transmission unit 11 for transmitting image data to the user, an image data storage unit 13 for storing the image data, usually composed of magnetic discs 12, and an image data management unit 14 for managing the storage information for the image data storage unit 13 and the information about the user, and is connected via a cable network 16 to the users' terminals 15.

The image data transmission unit 11 receives televising requests or VCR operations, such as rewind, fast forward, and slow motion from the user's terminal 15 and judges which are requests and which are VCR operations. When the user requests the televising of a desired program, the image data transmission unit 11 informs the image data management unit 14 of the program name and requests the title identification information (shown in FIG. 5A). Having received notification of an address given in the content of the title identification information from image data management unit 14, it accesses the appropriate address in the image data management unit 14 and requests the block identification information (shown in FIG. 5B). Having received notification of an address given in the content of the block identification information from image data management unit 14, it accesses the appropriate address in the image data management unit 14 and requests frame information (shown in FIG. 5C). Having received the frame information, it stores the frame information in its storage unit corresponding to the terminal 15 of the user who made the request. It accesses the address in the image data storage unit 13 stored in the frame information and requests the necessary image data. Having obtained the image data from the image data storage unit 13, it then transmits the image data to the terminal 15 which requested the televising of the program in question.

Also, when the image data transmission unit 11 receives the image data for final frame in a block, then, having accessed the address of the next block based on the block identification information, it requests the block identification information for the next block from the image data management unit 14.

Also, when the image data transmission unit 11 receives a notification of a VCR operation by the user, it has the appropriate VCR operation (fast forward, rewind, slow motion) performed on the image data and transmits this image data to the terminal 15.

This transmission of image data is performed in units of one frame (for example, frame A1-1 in sector 239 shown in FIG. 5C). After the image data transmission unit 11 has completed the transmission of one frame of image data, then the address of the next frame (with, for example, the next frame after frame A1-1 in sector 239 being frame A1-2 in sector 240) stored in its storage unit is retrieved. The image data transmission unit 11 then accesses the appropriate address in the image data storage unit 13 and retrieves the image data. Having retrieved 1 frame of image data from the image data storage unit 13, the image data transmission unit 11 then transmits this to the terminal 15. The execution of the transmission of 1 block at a time of image data is performed in this way by progressively going through the frame information stored in the storage unit.

It should be noted that in this embodiment 1 frame refers to 30 still pictures which represent 1 second of image data, and, since one block includes 900 frames, it can be seen to be composed of 15 minutes of image data.

The image data management unit 14 includes image management tables for the management of the image data and a request processing unit for executing processing in accordance with requests for the image management tables from the image data transmission unit 11.

Figure 6:
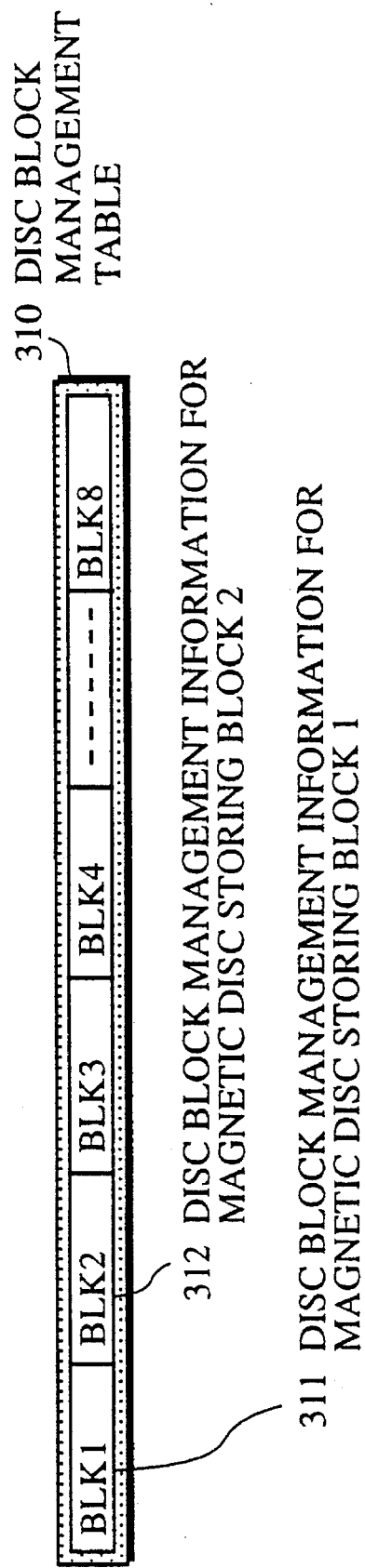
FIG. 6 is an example of the disc block management table under the present embodiment.

The image management tables include the title table 210 shown in FIG. 5A, the block table 220 shown in FIG. 5B, the frame table 230 shown in FIG. 5C, and the disc block management table 310 shown in FIG. 6.

The title table 210 stores a list of the title information made up of the titles of the programs stored in the image data in image data storage unit 13 corresponded with the first address of block 1 in the block table 220. From this title table 210 it can been seen that the image data for the program A, B, C, D, E . . . is stored in the image data storage unit 13. For example, the title information 211 for program A includes the program name "Title A" and the address of the first block of program A (block A1) 222 in the block table entry 221 for program A.

The block table 220 is composed of a separate block table entries for each program, 221 being the block table entry for program A, which shows that program A is divided into 8 blocks, A1, A2, A3, A4 ... A8. In the same way, block table entries (not illustrated) which show programs B, C, D, E ... divided into blocks are also prepared. The block table 220 stores a list of the block identification information made up of the name of every block corresponding with the address of the first frame of the block in the frame table 230, for each of the blocks for every program. The frame table 230 is made up of columns split into sections for every block for every program. For example, for program A, there is column 231 for block 1, column 232 for block 2, there is column 233 for block 3, column 234 for block 4, ... and column 238 for block 8. Programs B, C, D, E ... also have columns for each block (not illustrated) in the same way. Frame A1-1 in sector 239 in column 231 is stored in the image data storage unit 13 as the first address of block 1 of program A.

The disc block management table 310 has 8 sectors corresponding to each of the blocks in the block table 220, with a block number and the number of terminals 15 which are viewing the corresponding block in every program being recorded in each sector. For example, in sector 311 the number of terminals 15 viewing block 1 of the programs A, B, C, D, E ... is recorded. In the same way, in sector 312 the number of terminals 15 viewing block 2 of the programs A, B, C, D, E ... is recorded.

The request processing unit receives a request for title information out of the title table 210 from the image data transmission unit 11 and detects whether the requested program name (title) is present in the title table 210. After locating the program name, it notifies the image data transmission unit 11 of the title information which is stored so as to correspond an address to the program name. Once there is an access to the address stored corresponded to the notified program name by the image data transmission unit 11 in requesting block identification information, then the request processing unit determines whether the number of terminals 15 recorded in the sector of the disc block management table 310 corresponding to the accessed address is above a maximum number for which continuous transmission is possible. If it is above such a maximum number, then the request processing unit waits until the number of terminals falls below the maximum number, while, if it is below the maximum number, then immediate access is possible, and the request processing unit notifies the image data transmission unit 11 of the first address in the frame table 230 stored in the block table 220, and adds [1] to the number of terminals 15 recorded in the appropriate sector of the disc block management table 310.

As described above, the maximum number of continuous transmissions of image data when the image data storage unit 13 contains one magnetic disc 12 with an average retrieval rate of 2 MBytes/second, and the necessary data transfer rate of image data to the terminals 15 is 256KBytes/second, will be around 8.

Having gained access to the first address of every block in the frame able 230 notified from the image data transmission unit 11 as a request for the frame table 230, the request processing unit then notifies the image data transmission unit 11 of the column corresponding to the accessed address, for example, column 231 for block 1 of program A.

In the same way, when there is a request for the block identification information 223 of block 2 of program A from the image data transmission unit 11 following the request for column 231 of block 1 of program A, then the number of terminals 15 recorded in the corresponding sector of the disc block management table 310 is reduced by [1].

The image data storage unit 13 is constructed, for example, of 8 magnetic discs 12, as shown in FIG. 4, and stores the image data. The image data storage unit 13 stores the programs A, B, C, D, E ... as shown in the title table 210. Program A is split into 8 blocks, as shown in the block table entry 221, with each of the 8 blocks being stored on a different disc out of the 8 magnetic discs 12. In the same way, programs B, C, D, E ... are split into 8 blocks, with each of the 8 blocks for each program being stored on a different disc out of the 8 magnetic discs 12. It can be seen, therefore, that the image data for the blocks of the same number for every program are stored on the same magnetic disc 12.

The following is an explanation of the operation of the present embodiment.

Figure 7:
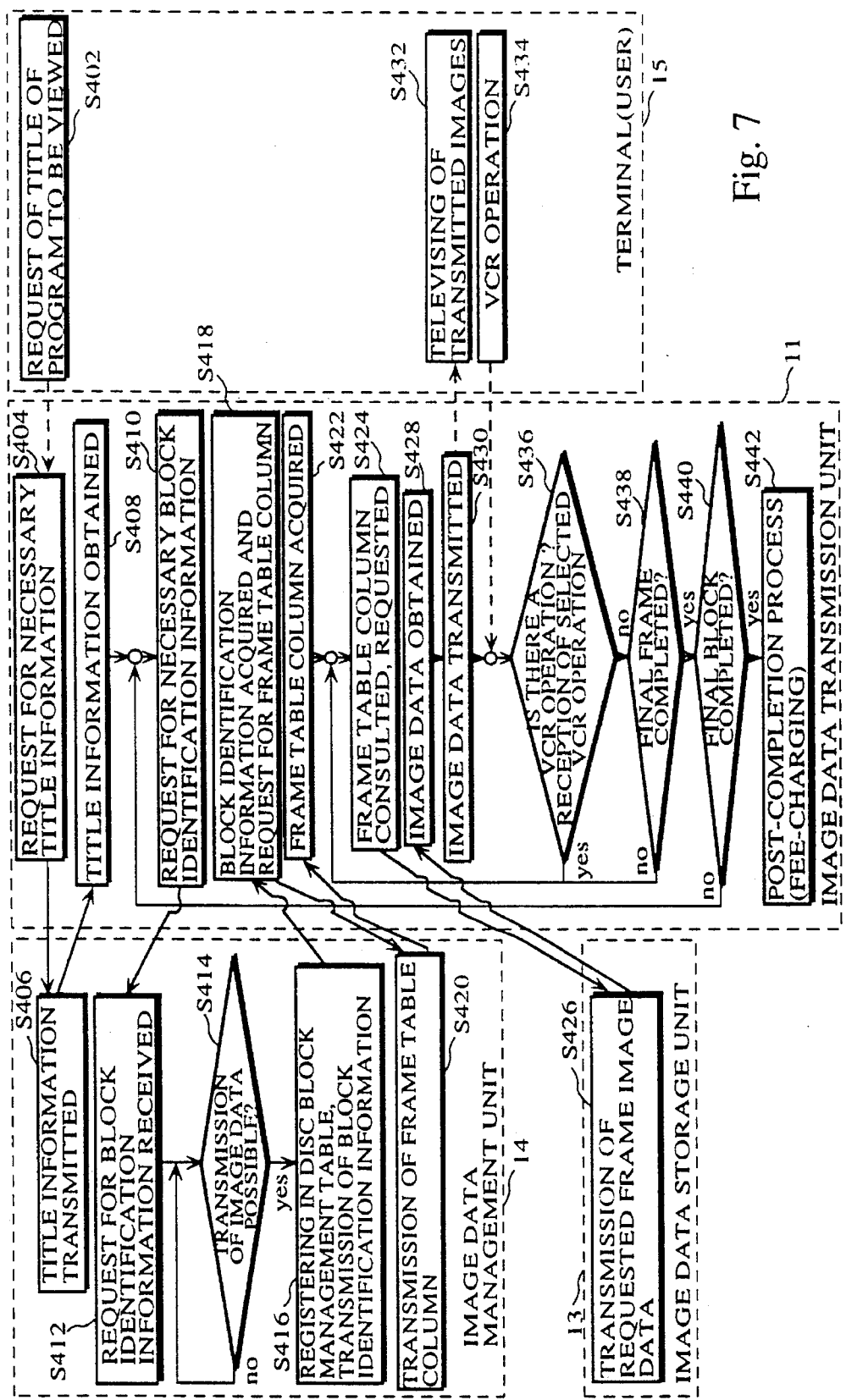
FIG. 7 is a drawing showing the operation of the present embodiment.

FIG. 7 is a drawing showing the process for the transmission of image data including interaction with the user for the video-on-demand system of the present embodiment shown in FIG. 4. The areas enclosed by broken lines show the operations performed by the image data transmission unit 11 the image data storage unit 13, image data management unit 14, and the terminal 15, respectively.

The user accesses the image data transmission unit 11 using the terminal 15 via the cable network 16, and requests the program to be viewed, for example, program A (step 402).

The image data transmission unit 11 then requests the title information for program A in the title table 210 from the image data management unit 14 (S404).

The image data management unit 14 then transmits the title information 211 for program A to the image data transmission unit 11 (S406), when the program requested by the user is A.

The image data transmission unit 11 obtains this title information 211 for program A (S408).

The image data transmission unit 11 then accesses the first address in the block table entry 221 for program A given in the title information 211, and requests the block identification information 222 for block 1 of program A from the image data management unit 14 (S410).

The image data management unit 14 then receives the request for the transmission of the block identification information 222 from the image data transmission unit 11 (S412).

The image data management unit 14 then retrieves the corresponding sector 311 in the disc block management table 310 and determines whether the transmission of the image data in frame A1-1 in sector 239, which is the first address for the frame table stored in the block identification information 222, is possible (S414). If the number of terminals 15 recorded in the retrieved sector 311 of the disc block management table 310 is below a maximum number for which continuous transmission of image data is possible, then it sends the block identification information 222 to the image data transmission unit 11 (S416). If the number of terminals 15 is equal to or above a maximum number for which continuous transmission of image data is possible, for example, when the number of terminals 15 is [8], then it waits until the number of terminals 15 is less than [8] (S414) before sending the block identification information 222 to the image data transmission unit 11 (S416). At the same time, since block 1 of image data is to be sent to terminal 15, [1] is added to the number of terminals in the sector 311 in the disc block management table 310 corresponding to the block identification information 222 for block 1 of program A (S416).

When the transmission of the image data for a block, for example, block 1, to the terminal 15 which requested the transmission is completed, then when the image data for block 2 is to be transmitted, then the number of terminals 15 presently recorded in sector 311 of the disc block management table 310 is reduced by [1] and the number of terminals 15 presently recorded in sector 312 is increased by [1] (S416).

The image data transmission unit 11 receives the block identification information 222 for block 1 of program A from the image data management unit 14 and requests the frame table column 231 for the corresponding block of program A (block 1) from the image data management unit 14 in accordance with the block identification information 222 (S418).

The image data management unit 14 then sends the frame table column 231 for block 1 of program A to the image data transmission unit 11 (S420).

The image data transmission unit 11 then receives the frame table column 231 for the corresponding block of program A from the image data management unit 14, and stores the frame table column 231 in its storage unit (S422).

The image data transmission unit 11 then requests the necessary image data by accessing the image data storage unit 13, starting from the first address which is frame A1-1 in stored at the top (sector 239) of the frame table column 231 before progressing on to frame A1-2 (sector 240) and so on (S424).

The image data storage unit 13 then transmits the requested image data (S426).

The image data transmission unit 11 then receives the necessary image data from the image data storage unit 13 (S428).

The image data transmission unit 11 then transmits the received image data to the user's terminal 15 (S430).

The user's terminal 15 receives the image data sent from the image data transmission unit 11 and the requested program is then televised on a monitor (S432).

If, while watching the requested program, the user makes use of a VCR operation using the terminal 15 (S434), then the image data transmission unit 11 judges whether such operation was a VCR operation, and, if it were a VCR operation, receives said operation, for example, slow motion (S436), before returning to S424, retrieving the frame table column 231, and requesting the image data from the image data storage unit 13 in accordance with the VCR operation mode. Following this, processes S428–S432 are executed.

If there has been no VCR operation (S436), then the image data transmission unit 11 determines whether the final frame A1-900 in the frame table column 231 for program A has been completed or not, repeating the process from S424 onwards when it has not been completed, or moving on to S440 when it has (S438).

In S440, the image data transmission unit 11 determines whether the final block, for example, block A8, has been completed, repeating the process from S410 onwards when it has not been completed, or moving on to S442 when it has.

In step S442, the image data transmission unit 11 completes the transmission of all of the image data and executes a process, such as a fee-charging process, after completion.

It should be noted that although the sectors 311, 312 in the disc block management table 310 in this embodiment store only the number of terminals 15 which are viewing each block, if the start of viewing time is added to the number of terminals, then, in S414, the user's terminal which is in a waiting state may also be informed of the necessary waiting time.

In the same way, in the present embodiment, a block management table 310 is provided, although it is possible for the system to operate without such a block management table. However, in such a case it will be difficult to ensure that image data is transmitted uninterruptedly, but, since the storage unit in the image data transmission unit 11 needs to store only part of the frame table 230, this part being one of the frame table columns 231, 232, 233, 234, . . . 238, a reduction in its memory capacity can be definitely be made.

Second Embodiment

Figure 8:
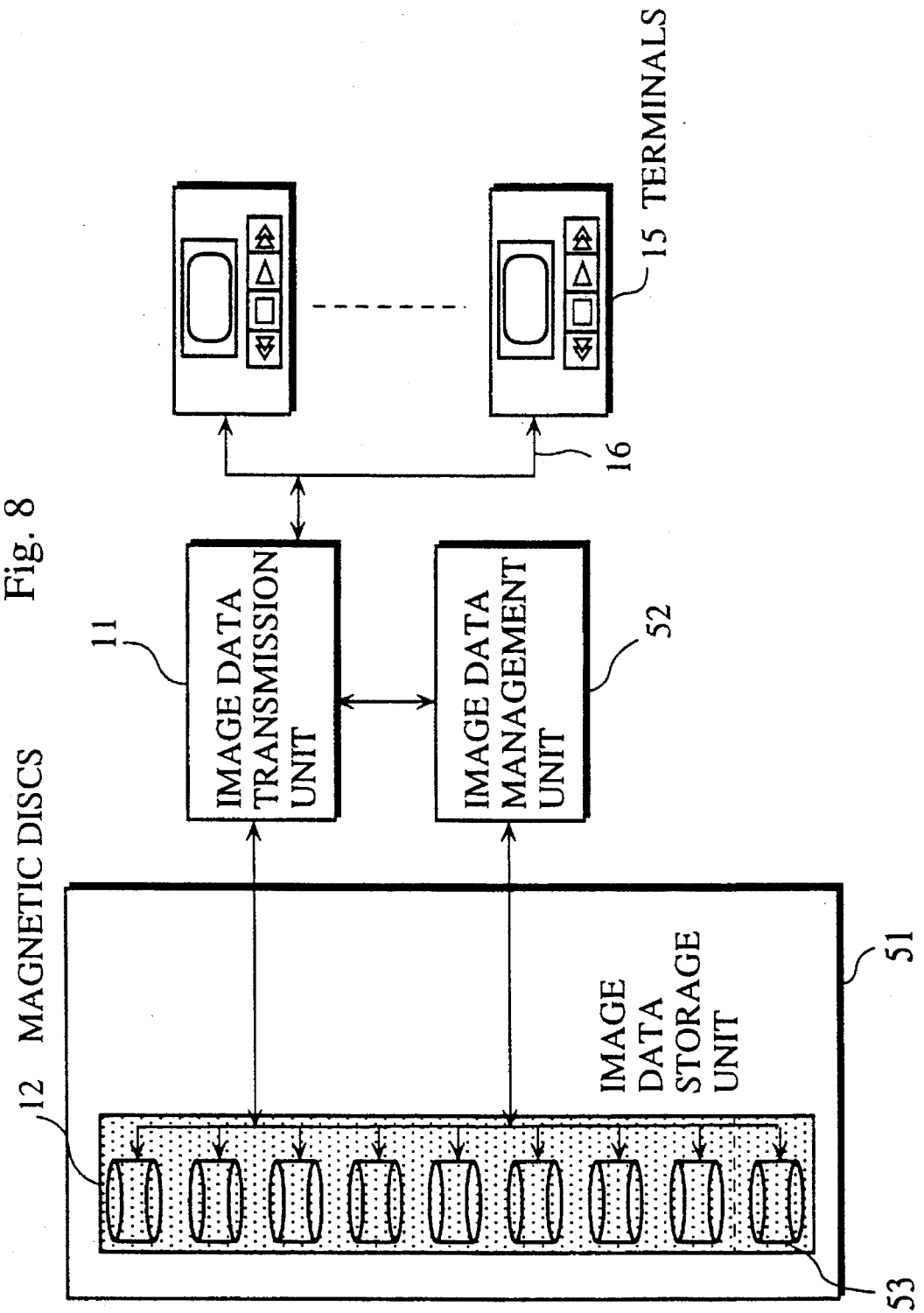
FIG. 8 is a construction of a video-on-demand system according to the second embodiment of the present invention.

FIG. 8 is a construction of a video-on-demand system according to the second embodiment of the present invention. The video-on-demand system of this second embodiment includes an image data transmission unit 11 for transmitting image data to the user, an image data storage unit 51 for storing the image data, and an image data management unit 52 for managing the storage information for the image data storage unit 51 and the information about the user, and is connected to the user via a terminal 15 and a cable network 16. Here, construction elements which are the same as the first embodiment have been given the same reference numerals and their explanation has been omitted.

The image data storage unit 51 includes a reserve magnetic disc 53 and a control unit in addition to the 8 magnetic discs 12 in the image data storage unit 13. When, under a predetermined condition, the number of terminals viewing the image data stored on the same magnetic disc out of the 8 magnetic discs 12 becomes [7], then, at an indication from the image data management unit 52, the content of the magnetic disc for one program is copied onto this reserve magnetic disc 53.

The control unit of the image data storage unit 51 copies the content of the magnetic disc for one program onto the reserve magnetic disc 53 from one of the magnetic discs out of the 8 magnetic discs 12 at an indication from the image data management unit 52, and, having completed the copying process, gives notification of termination of copying to the image data management unit 52.

The image data management unit 52 includes image data management tables for the management of image data, a request processing unit for executing the processing of the requests for the image management tables from the image data transmission unit 11, and a managing unit for executing the management of the image data stored in the image data storage unit 51.

Figure 10A:
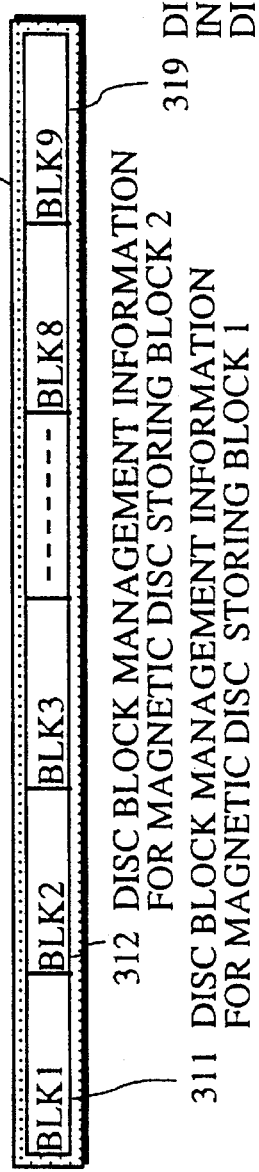
FIG. 10A is an example of the disc block management table under the second embodiment.
Figure 10B:
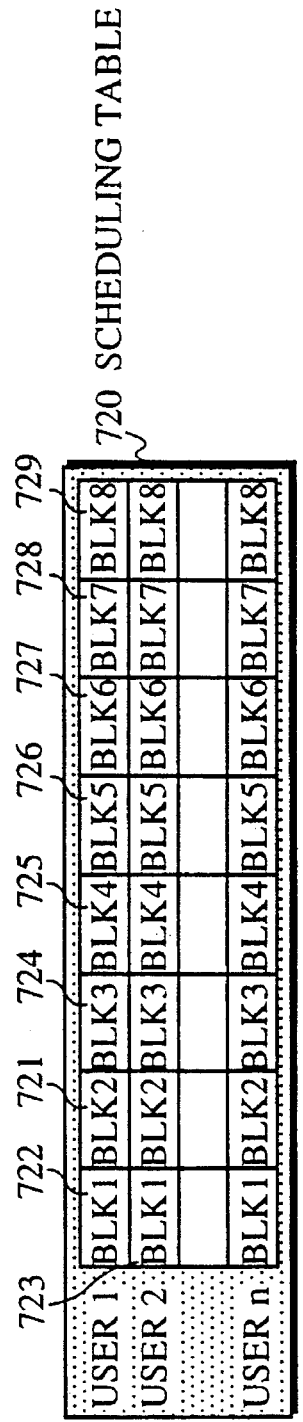
FIG. 10B is an example of the scheduling table under the second embodiment.

The image management tables are made up of the title table 210 shown in FIG. 9A, the block table 610 shown in FIG. 9B, the frame table 620 shown in FIG. 9C, the disc block management table 710 shown in FIG. 10A, and the scheduling table 720 shown in FIG. 10B.

The title table 210 is the same as the title table 210 in the first embodiment. The block table 610 includes, in addition to the block table 220 in the first embodiment, a reserve column 611. In the same way, the frame table 620 includes, in addition to the frame table 230 in the first embodiment, a reserve column 621. The disc block management table 710 includes, in addition to the disc block management table 310 in the first embodiment, a reserve sector 319 corresponding to the reserve column 611 in the block table 610.

The scheduling table 720 stores a list of the information showing which block of which program each user of the terminals 15 is currently viewing, as well as the blocks for which there is the possibility of viewing. For example, if user 1 is watching block 2 of program A, then a "mid-viewing" indication will be recorded in sector 721 in the scheduling table 720 by the request processing unit.

The request processing unit, in addition to the construction of the request processing unit in the image data management unit 14 in the first embodiment, includes the construction described below.

When there is a request for the transmission of the block identification information, such as block identification information 222 for block 1, in the block table 610 directly after the acquisition of the title information, such as title information 211, from the image data transmission unit 11, then, in the same way as the first embodiment, the request processing unit determines whether the number of terminals 15 recorded in the sector 311 in the disc block management table 710 corresponding to the accessed address is [7] or above. If it is [7] or above, then it waits until the number of terminals 15 is below [7], and, when it is below [7], then direct access is permitted.

When there is no request directly after the acquisition of the title information, such as title information 211, or there is a request for block identification information for a block (block 2-block 8) aside from the block identification information for block 1, the number of users in a sector in the disc block management table 710 is not retrieved, and content of the block identification information is transmitted to the image data transmission unit 11.

When there is a request from the image data transmission unit 11, for example, for the frame table column 231 of block 1 of program A in the frame table 620, if this is the viewing of the beginning of block 1, then, in the scheduling table 720, an indication that the user is presently viewing is recorded in sector 722, an indication of the possibility of viewing after a fast forward operation is recorded in sector 721, as well as indications of viewing as program A progresses being recorded in sectors 724–729, and the frame table column 231 is sent to the image data transmission unit 11.

FIG. 11A shows the an example of the status recorded in the scheduling table 720 by the request processing unit. The terminals 15 of user 1 to user 7 are all watching the image data in block 1 of the same program of title A, which is shown by the "mid-viewing" shading, with the possibility of the advance to block 2 using a fast forward operation being highlighted by the lighter shading, and the registering of title A showing that there is a possibility of viewing for block 3 through block 8.

When users 1 to 7 move on from the viewing of block 1 to block 2 with the passage of time, the request processing unit changes the "mid-viewing" indication in sector 811 for block 1, and registers the "mid-viewing" indication in sector 812 for block 2 for the users 1–7, as well as sending the frame table column 232 to the image data transmission unit 11.

FIG. 11b shows an example of the status of the scheduling table 720 in such a case. Users 1–7 are presently viewing block 2 shown by the shading in sectors 812, while the possibility of returning to block 1 due to a rewind operation is shown by different shading in sectors 811 and the possibility of advancing to block 3 due to a fast forward operation is shown again by different shading in sectors 813, with the possibility for the viewing of blocks 4 through 8 being shown in sectors 814 through 818.

Since the number of terminals 15 stored in sector 311 in the disc block management table 710 is [0], when the user's terminal 15 requests program A to the image data transmission unit 11, then the image data transmission unit 11 obtains the appropriate title information 211 and requests the block identification information 222, with the request processing unit then sending the block identification information 222 to the image data transmission unit 11.

In the same way, if there is a request for the frame table column 231 for block 1 of program A, then, as described above, then in addition to recording this in the scheduling table 720, it sends the frame table column 231 to the image data transmission unit 11.

Also, when the management unit receives notification of the termination of copying from the image data storage unit 51, for example, when there is a request for the frame table column 232 of block 2 of program A, then, as described below, a newly generated frame table column 621 is sent to the image data transmission unit 11.

The management unit oversees the number of terminals 15 which are viewing each block recorded in the scheduling table 720, so that when the number of terminals viewing blocks having a same block number out of any of the programs reaches [7], and there is a terminal 15 viewing a block having a block number adjacent to said same block number in a same program as any of the programs to which a block out of said blocks having said same block number belongs, then the management unit gives an indication to the image data storage unit 51 to copy that part of the same program from one of the magnetic discs 12 onto the reserve magnetic disc 53.

FIG. 12A shows a scheduling table 720 in a state where the terminals 15 of users 1–7 are viewing the image data in block 2 of title (program) A, and user 8 is viewing the image data in block 1 of title A. For users 1–7, there is the possibility of returning to block 1 by means of a rewind operation or of advancing to block 3 by means of a fast forward operation, while for user 8 there is the possibility of advancing to block 2 by means of a fast forward operation.

On such an occasion, the management unit gives an indication to the image data storage unit 51 to copy the image data in block 2 of program A stored on one out of the magnetic discs 12 onto the reserve magnetic disc 53 in the image data storage unit 51, as described above.

Having received a termination of copying notification from the image data storage unit 51, the management unit records the block identification information for block 9, corresponding to the block 2 of program A, in the reserve column 611 in the block table 610, and records the frame table column 621 for block 9 of program A in the reserve column 621 in the frame table 620, as well as preparing the sector 319 for block 9 in the disc block management table 710 in the same way.

The first address of the frame table column 621 for block 9 of program A in frame table 620 is recorded in the block identification information (stored in 611) by the management unit, and the address of the magnetic disc 53 in the image data storage unit 51 is recorded in the frame table column 621 by the management unit.

When the frame table column 621 for block 9 which is the new copy of block 2 made by the request processing unit is sent to the image data transmission unit 11, [1] is added to the number of terminals 15 in sector 319 in the disc block management table 710.

In the present embodiment, the request processing unit in the image data management unit 52, in notifying the image data transmission unit 11 of the block table 610, has a limit of [7]which is [1] fewer than in the previous first embodiment, so that the image data storage unit 51 makes a copy of the image data.

Also, in this embodiment, the case where users 1 through 8 are all viewing the same program has been explained, but even for the case where users 1 through 7 are all watching completely different programs, the invention is still effective when user 8 is viewing the same program as one of those viewed y users 1 through 7.

FIG. 12B shows the scheduling table 720 showing the case when users 1 through 7 are all viewing the images in block 2 of program A and user 13 fast forwards from block 1 of program A to block 9 which is a copy of block 2 of program A.

The following is an explanation of the operation of the present embodiment.

Figure 13:
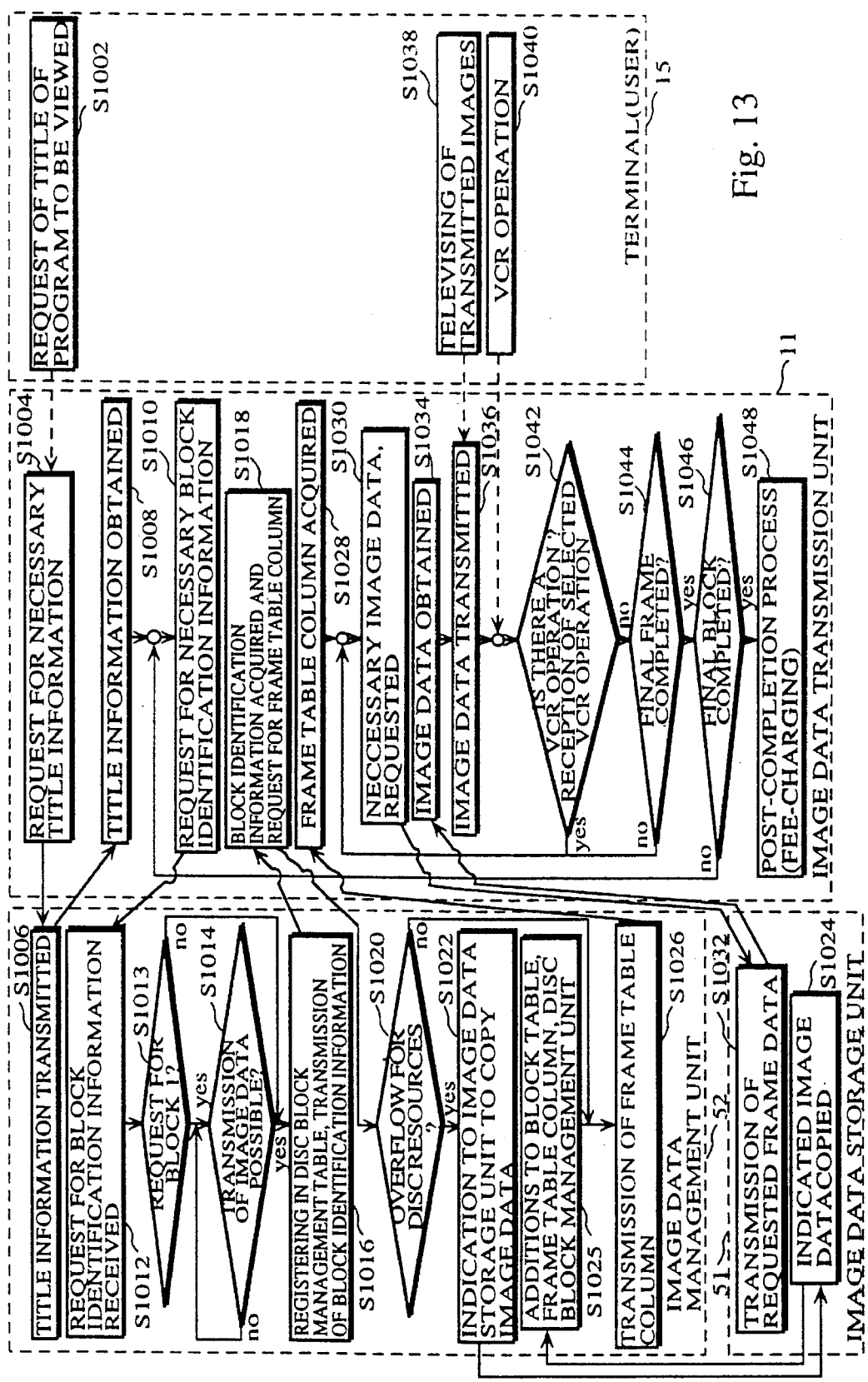
FIG. 13 is a drawing showing the operation of the second embodiment.

FIG. 13 is a drawing showing the process for the transmission of image data including interaction with the user for the video-on-demand system of the present embodiment shown in FIG. 8. The areas enclosed by broken lines show the operations performed by the image data transmission unit 11, the image data storage unit 51, the image data management unit 52, and the user's terminal 15, respectively.

The user accesses the image data transmission unit 11 using the terminal 15 via the cable network 16, and requests the program to be viewed (step 1002).

The image data transmission unit 11 then requests the title information for the program requested by the user from the image data management unit 52 (S1004).

The image data management unit 52 then transmits the title information 211 for program A to the image data transmission unit 11 (S1006) when the program requested by the user is A.

The image data transmission unit 11 obtains this title information 211 (S1008).

The image data transmission unit 11 then accesses the first address in the block table entry 221 for program A given in the title information 211, and requests the block identification information 222 for block 1 of program A from the image data management unit 52 (S1010).

The image data management unit 52 then receives the request for the transmission of the block identification information 222 from the image data transmission unit 11 (S1012).

Next, the image data management unit 52 determines whether there is a request for block identification information 222 for block 1 directly after the acquisition of the title information 211 (S1013). If there is a request directly after the acquisition of the title information 211, then the sector 311 in the disc block management table 710 is retrieved and it is judged by the image data management unit 52 whether the transmission of the image data corresponding to the first address in the frame table column 231 recorded in the block identification information 222 is possible (S1014). If there is no request directly after the acquisition of the title information 211, or there is a request for the block identification for a block aside from block 1, or if the number of terminals 15 recorded in the retrieved sector 311 of the disc block management table 710 is below [7] signifying that uninterrupted transmission of image data is possible, then the block identification information, such as block identification information 222, is sent to the image data transmission unit 11 (S1016).

When the number of terminals 15 recorded in the retrieved sector 311 of the disc block management table 710 is [7] or above, signifying that uninterrupted transmission of image data is not possible, then it waits until the number is below [7] (S1014), and then sends the block identification information 222 (S1016). At the same time, since the image data for block 1 is to be sent to the terminal 15, the presently recorded number of terminals 15 in sector 311 in the disc block management table 710 for the block identification information 222 for block 1 of program A is increased by [1] (S1016).

In the same way, when the transmission of image data for 1 block, for example, block 1, to the user's terminal 15 in question is completed, or more specifically, when the retrieval of the image data for block 1 from the image data storage unit 51 is complete, the number of terminals 15 presently registered in the corresponding sector (here, sector 311) in the disc block management table 710 is reduced by [1], and when the image data for block 2 is transmitted, the number of terminals 15 presently recorded in the corresponding sector (sector 312) in the disc block management table 710 is increased by [1] (S1016).

Next, the image data transmission unit 11, having acquired for example, the block identification information 223, requests to the image data storage unit 51 the transmission of the frame table column 232 (S1018). The image data management unit 52 then receives the request for the transmission of the frame table column 232, retrieves the content of the sector 312 in the scheduling table 720 corresponding to block 2, and judges whether 7 or more users are viewing the image data (S1020).

If the number of viewing users' terminals is below [7], then the image data management unit 52 transmits the frame table column 232 to the image data transmission unit 11 (S1026).

If the number of viewing users' terminals is [7] or above, then the image data management unit 52 retrieves the sectors in the disc block management table 710 for the neighboring blocks, in this case, sectors 311, 313 for blocks 1 and 3, and, if there are [1] or more users viewing the same program A as the viewed block 2 of program A (S1020), indicates to the image data storage unit 51 to copy the image data in block 2 of program A (S1022).

The image data storage unit 51, on receiving the indication for block 2 from the image data management unit 52, copies the part of program A from the magnetic disc 12 corresponding to block 2 onto the reserve magnetic disc 53. On terminating the copying operation, the image data storage unit 51 then notifies the image data management unit 52 that copying is terminated (S1024).

On receiving the notification that copying is terminated, the image data management unit 52 prepares the reserve column 611 in the block table 610, a new frame table column in the reserve column 621 in the frame table 620, and sector 319 in the disc block management table 710, all for the new block which corresponds to block 2 in program A (S1025).

The image data management unit 52 transmits the requested frame table column 232 or the newly formed frame table column 621 to the image data transmission unit 11 (S1026).

From here on, S1028–S1048 are the same as S422–S422 in the first embodiment, so no further explanation is given.

It should be noted that in this embodiment, the image data management unit 52 oversees the number of terminals 15 viewing each block recorded in the scheduling table 720, but it may instead oversee the number of terminals 15 viewing each block recorded in each sector 311, 312 . . . in the disc block management table 710.

Also, in this embodiment, the case where there is only one reserve magnetic disc 53 is described, but this number should not be construed as being limited to one, so that it is equally possible for the system to be equipped with a number of reserve magnetic discs.

Also, in this embodiment, the recording media used are recording media for which rewriting is possible, such as optical magnetic discs and phase change rewritable optical discs, which may be utilized, copying onto them whenever necessary.

Also, the supposition has been made in the above 2 embodiments that the word "disc" refers to the use of only one disc, but it is also possible to logically consider the use of a number of discs as being that of one disc.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A video-on-demand system, comprising:

an image data storage device, including a plurality of recording media for storing a plurality of programs, for storing image data for the programs divided into a plurality of blocks which are distributed among all of the recording media;

an image data management device, including image data management tables in which management information for the image data is stored, for consulting the image data management tables and transmitting management information separately for each block, when there is a request from outside the device for information about one of the programs, wherein the image data management tables comprise a title table for corresponding a title of each of the programs with starting block identification information for each of the programs, a block table for corresponding block identification information for each of the blocks with starting frame identification information for each of the blocks, and a frame table for corresponding frame identification information for each frame with position information showing at which position on which recording medium out of the recording media each of the frames is stored; and an image data transmission device for requesting to the image data management device for management information related to a block which is to be transmitted in a transmission of a program requested by a user, for receiving the management information from the image data management device, for retrieving image block data separately for each block from the recording media and for transmitting the image block data to the user.

2. The video-on-demand system of claim 1, wherein a number of the recording media disposed in the image data storage device is equal to or above a number of the blocks of image data in one program.

3. The video-on-demand system of claim 2, wherein the image data transmission device includes:

request means for receiving a request for a televising of one of the programs from the user, and requesting to the image data management device a transmission of storage position information which shows at which position on which recording medium each separate block in the program is stored;

image data retrieval/transmission means for receiving the transmission of the storage position information for each separate block of the program from the image data management device, for retrieving the image block data for each separate block from the position designated by the storage position information on the recording medium designated by the storage position information, and transmitting the image block data to the user;

request continuation means for requesting to the image data management device, when the image data retrieval/transmission means has finished retrieving the image block data for one block, a transmission of storage position information of image block data for a next block following after the block for which retrieving is finished; and image data retrieval/transmission continuation means for receiving the transmission of the storage position information of the image block data for the next block from image data management device, for retrieving the image block data for the next block from a position designated by the storage position information on a recording medium designated by the storage position information, and transmitting the image block data to the user, and wherein the image data management device includes:

first request processing means for receiving a transmission request for the storage position information for the image block data for each separate block from the request means, for consulting the image data management tables and for transmitting the storage position information as to in which position on which recording medium the image block data is stored to the image data retrieval/transmission means; and second request processing means for receiving a transmission request for the storage position information for the image block data from the request continuation means, for consulting the image data management tables and transmitting the storage position information for the image block data to the image data retrieval/transmission continuation means.

4. The video-on-demand system of claim 3, wherein the request means includes:

a title information request unit for receiving an indication of a program name from the user and for requesting title information for the program name from the first request processing means;

a first block identification information request unit for receiving the title information, for consulting the title information and for requesting the starting first block identification information from the first request processing means;

a first frame table request unit for receiving the starting block identification information, for consulting the starting block identification information and requesting a frame table column specified in the starting block identification information from the first request processing means;

a first frame table storage unit for storing the frame table column;

a second block identification information request unit for consulting, once one of the image data retrieval transmission means and the image data retrieval transmission continuation means has completed retrieving the image block data of one block, the block identification information of a completed block and requesting new block identification information for the next block from the second request processing means;

a second frame table request unit for receiving the new block identification information, for consulting the new block identification information and requesting a new frame table column from the second request processing means; and a second frame table storage unit for storing the new frame table column, wherein the first request processing means includes:

a title information transmission unit for receiving a request from the title information request unit, for consulting the title table, and transmitting the title information corresponding to the program to the first block identification information request unit;

a first block identification information transmission unit for receiving a request from the first block identification information request unit, for consulting the block table and for transmitting the starting block identification information to the first frame table request unit; and a first frame table transmission unit for receiving a request from the first frame table request unit, for consulting the frame table and for transmitting to the first frame table memory unit the frame table column for an indicated starting block, and wherein the second request processing means includes:

a second block identification information transmission unit for receiving a request from the second block identification information request unit, for consulting the block table and for transmitting the block identification information for the next block to the second frame table request unit; and a second frame table transmission unit for receiving a request from the second frame table request unit, for consulting the frame table and for transmitting to the second frame table memory unit the new frame table column for the next block.

5. The video-on-demand system of claim 4, wherein the image data management device further includes:

number of users storage means for storing a number of users who are simultaneously viewing blocks having a same block number in any of the programs;

image data transmission possibility judgement means for judging whether the number of users for a starting block recorded in the number of users storage means is within a range for which uninterrupted transmission of the image data is possible; and block identification information transmission cancellation indication means for giving an indication to the first block identification information transmission unit to cancel transmission of the starting block identification information, when the image data transmission possibility judgement means judges that the transmission is not possible.

6. The video-on-demand system of claim 5, wherein the number of users storage means updates the number of users viewing a block, when the block identification information of the block is transmitted by one of the first block identification information transmission unit and the second block identification information transmission unit, and when one of the image data retrieval/transmission means and the image data retrieval/transmission continuation means has finished retrieving the image block data for one block.

7. The video-on-demand system of claim 6, wherein the image data transmission possibility judgement means includes:

number of users retrieval means for retrieving the number of users for each block from the number of users storage means;

maximum number of transmissions calculator for calculating a maximum number of transmissions which is a value given by dividing an average retrieval rate for the image data from the image data storage device by the image data retrieval/transmission means by a transfer rate for a transfer of the image data to the user and subtracting a constant; and a possibility judgement unit for judging that the transmission is not possible when the number of users of the starting block, retrieved by the number of users retrieval means, is equal to or above the maximum number of transmissions calculated by the maximum number of transmissions calculator.

8. The video-on-demand system of claim 7, wherein the image data management device further includes:

schedule storage means for storing programs being viewed in terms of each separate block unit for each user; and copy indication means for giving an indication, when the number of user viewing a given block retrieved by the number of users retrieval unit becomes equal to the maximum number of transmissions calculated by the maximum number of transmissions calculator, and, in the schedule storage means, a program for a block which is one of a block preceding and following the given block coincides with one of the programs for the given block, to the image data storage device to copy image block data for the given block in the coinciding program, wherein the image data storage device includes reserve image data storage means, comprising a reserve recording medium separate from the recording media, for copying image data onto the reserve recording medium at the indication from the copy indication means.

9. The video-on-demand system of claim 8, wherein the image data management device further includes:

image data management table writing means for writing new block identification information and a new frame table column corresponding to the image data copied by the reserve image data storage means into the block table and the frame table in the image data management tables; and number of users addition storage means, which provides a storage column corresponding to a new block in the reserve image data storage means to the number of users storage means aside from storage columns for storing the number of users, for adding and storing the number of users viewing a block in a corresponding storage column.

10. The video-on-demand system of claim 9, wherein after the reserve image data storage means has notified the image data management device that it has finished copying the image block data onto the reserve recording medium, then when there has been a request for a frame table column corresponding to the image block data, from one of the first frame table request unit and the second frame table request unit, then one of the first frame table transmission unit and the second frame table transmission unit transmits the frame table column newly written in by the image data management table writing means.

11. The video-on-demand system of claim 10, wherein the reserve recording medium in the reserve image data storage means is constructed of an optical magnetic disc.

12. The video-on-demand system of claim 10, wherein the reserve recording medium in the reserve image data storage means is constructed of phase change rewritable optical disc.

13. The video-on-demand system of claim 4, wherein the image data management device further includes:

number of users storage means for storing a number of users who are simultaneously viewing blocks having a same block number in any of the programs;

image data transmission possibility judgement means for judging whether the number of users for a given block number recorded in the number of users storage means is within a range for which uninterrupted transmission of the image data is possible; and block identification information transmission cancellation indication means for giving an indication to one of the first block identification information transmission unit and the second block identification information transmission unit to cancel transmission of the block identification information of a block having the given block number, when the image data transmission possibility judgement means judges that the transmission is not possible.

14. The video-on-demand system of claim 13, wherein the image data transmission possibility judgement means includes:

number of users retrieval means for retrieving the number of users for each block from the number of users storage means;

maximum number of transmissions calculator for calculating a maximum number of transmissions which is a value given by dividing an average retrieval rate for the image data from the image data storage device by the image data retrieval/transmission means by a transfer rate for a transfer of the image data to the user; and a possibility judgement unit for judging that transmission is not possible when the number of users retrieved by the number of users retrieval means is not below the maximum number of transmissions calculated by the maximum number of transmissions calculator.

15. The video-on-demand system of claim 1, wherein the image data management device includes:

number of users storage means for storing a number of users who are simultaneously viewing blocks having a same block number in any of the programs;

image data transmission possibility judgement means for judging whether the number of users for a starting block recorded in the number of users storage means is within a range for which uninterrupted transmission of the image data is possible; and necessary information transmission cancellation means for cancelling a transmission of necessary information for the starting block when the image data transmission possibility judgement means has judged that the transmission is not possible.

16. A method for supplying programs in a video-on-demand system, comprising:

an image data storage step for storing image data for a plurality of programs divided into a plurality of blocks which are distributed among a plurality of recording media;

an image data management step for storing image data management tables including a title table for corresponding a title of each of the programs with starting block identification information for each of the programs, a block table for corresponding block identification information for each of the blocks with starting frame identification information for each of the blocks, and a frame table for corresponding frame identification information for each frame with position information showing at which position on which recording medium out of the recording media each of the frames is stored, and for consulting the image data management tables and transmitting management information separately for each block, when there is a request for information about one of the programs; and an image data transmission step for requesting that management information related to a block which is to be transmitted in a transmission of a program requested by a user be transmitted by the image data management step, for receiving the management information transmitted by the image data management step, for retrieving image block data separately for each block from the recording media and for transmitting the image block data to the user.

17. The method of claim 16 wherein, in the image data storage step, each program is divided so that a number of blocks of image data in one program is not greater than a number of recording media.

18. The method of claim 17, wherein the image; data transmission step includes:

a request step for receiving a request for a televising of one of the programs from the user, and requesting from the stored image data management tables for a transmission of storage position information which shows at which position on which recording medium each separate block in the program is stored;

an image data retrieval/transmission step for receiving the transmission of the storage position information for each separate block of the program from the image data management tables, for retrieving the image block data for each separate block from the position designated by the storage position information on the recording medium designated by the storage position information, and transmitting the image block data to the user;

a request continuation step for requesting to the image data management tables, when the image data retrieval/transmission step has finished retrieving the image block data for one block, for a transmission of storage position information of image block data for a next block following after the block for which retrieving is finished; and an image data retrieval/transmission continuation step for receiving the transmission of the storage position information of the image block data for the next block from the image data management tables, for retrieving the image block data for the next block from a position designated by the storage position information on a recording medium designated by the storage position information, and transmitting the image block data to the user, wherein the image data management step further includes:

a first request processing step for receiving a transmission request for the storage position information for the image block data for each separate block from the request step, for consulting the image data management tables and for transmitting the storage position information as to in which position on which recording medium the image block data is stored to the image data retrieval/transmission step; and a second request processing step for receiving a transmission request for the storage position information for the image block data from the request continuation step, for consulting the image data management tables and transmitting the storage position information for the image block data to the image data retrieval/transmission continuation step.

19. The method of claim 18, wherein the request step includes:

a title information request step for receiving an indication of a program name from the user and for requesting title information for the program name from the first request processing step;

a first block identification information request step for receiving the title information, for consulting the title information and for requesting the starting first block identification information from the first request processing step;

a first frame table request step for receiving the starting block identification information, for consulting the starting block identification information and requesting a frame table column specified in the starting block identification information from the first request processing step;

a first frame table storage step for storing the frame table column;

a second block identification information request step for consulting, once one of the image data retrieval transmission step and the image data retrieval transmission continuation step has completed retrieving the image block data of one block, the block identification information of a completed block and requesting new block identification information for the next block from the second request processing step;

a second frame table request step for receiving the new block identification information, for consulting the new block identification information and requesting a new frame table column from the second request processing step; and a second frame table storage step for storing the new frame, table column, wherein the first request processing step includes:
a title information transmission step for receiving a request from the title information request step, for consulting the title table, and transmitting the title information corresponding to the program to the first block identification information request step;

a first block identification information transmission step for receiving a request from the first block identification information request step, for consulting the block table and for transmitting the starting block identification information to the first frame table request step; and a first frame table transmission step for receiving a request from the first frame table request step, for consulting the frame table and for transmitting to the first frame table memory step the frame table column for an indicated starting block, and wherein the second request processing step includes:
a second block identification information transmission step for receiving a request from the second block identification information request step, for consulting the block table and for transmitting the block identification information for the next block to the second frame table request step; and a second frame table transmission step for receiving a request from the second frame table request step, for consulting the frame table and for transmitting to the second frame table memory step the new frame table column for the next block.

20. The method of claim 19, wherein the image data management step further includes:

a number of users storage step for storing a number of users who are simultaneously viewing blocks having a same block number in any of the programs;

an image data transmission possibility judgment step for judging whether the number of users for a starting block recorded in the number of users storage step is within a range for which uninterrupted transmission of the image data is possible; and a block identification information transmission cancellation indication step for giving an indication to the first block identification information transmission step to cancel transmission of the starting block identification information, when the image data transmission possibility judgment step judges that the transmission is not possible.

21. The method of claim 20, wherein the number of users storage step updates the number of users viewing a block, when the block identification information of the block is transmitted by one of the first block identification information transmission step and the second block identification information transmission step, and when one of the image data retrieval/transmission step and the image data retrieval/transmission continuation step has finished retrieving the image block data for one block.

22. The method of claim 21, wherein the image data transmission possibility judgment step includes:

a number of users retrieval step for retrieving the number of users for each block from the number of users storage step;

a maximum number of transmissions calculation step for calculating a maximum number of transmissions which is a value given by dividing an average retrieval rate for the image data from the image data storage step by the image data retrieval/transmission step by a transfer rate for a transfer of the image data to the user and subtracting a constant; and a possibility judgment step for judging that the transmission is not possible when the number of users of the starting block, retrieved by the number of users retrieval step, is equal to or above the maximum number of transmissions calculated by the maximum number of transmissions calculation step.

23. The method of claim 22, wherein the image data management step further includes:

a schedule storage step for storing programs being viewed in terms of each separate block unit for each user; and a copy indication step for giving an indication, when the number of users viewing a given block retrieved by the number of users retrieval step becomes equal to the maximum number of transmissions calculated by the maximum number of transmissions calculation step and, in the schedule storage step, a program for a block which is one of a block preceding and following the given block coincides with one of the programs for the given block, to the image data storage step to copy image block data for the given block in the coinciding program, wherein the image data storage step includes a reserve image data storage step, for copying image data onto a reserve recording medium separate from the recording media, at the indication from the copy indication step.

24. The method of claim 23, wherein the image data management step further includes:

an image data management table writing step for writing new block identification information and a new frame table column corresponding to the image data copied by the reserve image data storage step into the block table and the frame table in the image data management tables; and a number of users addition storage step, which provides a storage column corresponding to a new block in the reserve image data storage step to the number of users storage step aside from storage columns for storing the number of users, for adding and storing the number of users viewing a block in a correspond storage column.

25. The method of claim 24, wherein after the reserve image data storage step has notified the image data management step that it has finished copying the image block data onto the reserve recording medium, then when there has been a request for a frame table column corresponding to the image block data, from one of the first frame table request step and the second frame table request step, then one of the first frame table transmission step and the second frame table transmission step transmits the frame table column newly written in by the image data management table writing step.

26. The method of claim 19, wherein the image data management step further includes:
 a number of users storage step for storing a number of users who are simultaneously viewing blocks having a same block number in any of the programs;
 an image data transmission possibility judgment step for judging whether the number of users for a given block number recorded in the number of users storage step is within a range for which uninterrupted transmission of the image data is possible; and
 block identification information transmission cancellation indication step for giving an indication to one of the first block identification information transmission step and the second block identification information transmission step to cancel transmission of the block identification information of a block having the given block number, when the image data transmission possibility judgment step judges that the transmission is not possible.

27. The video-on-demand system of claim 26, wherein the image data transmission possibility judgment step includes:
 a number of users retrieval step for retrieving the number of users for each block from the number of users storage step;
 a maximum number of transmissions calculation step for calculating a maximum number of transmissions which is a value given by dividing an average retrieval rate for the image data from the image data storage step by the image data retrieval/transmission step by a transfer rate for a transfer of the image data to the user; and
 a possibility judgment step for judging that transmission is not possible when the number of users retrieved by the number of users retrieval step is not below the maximum number of transmissions calculated by the maximum number of transmissions calculation step.

28. The video-on-demand system of claim 16, wherein the image data management step includes:
 a number of users storage step for storing a number of users who are simultaneously viewing blocks having a same block number in any of the programs;
 image data transmission possibility judgment step for judging whether the number of users for a starting block recorded in the number of users storage step is within a range for which uninterrupted transmission of the image data is possible; and
 a necessary information transmission cancellation step for cancelling a transmission of necessary information for the starting block when the image data transmission possibility judgment step has judged that the transmission is not possible.

* * * * *

UNITED STATES PATENT AND TRADEMARK OFFICE
CERTIFICATE OF CORRECTION

PATENT NO. : 5,568,180
DATED : October 22, 1996
INVENTOR(S) : Tadashi Okamoto

It is certified that error appears in the above-indentified patent and that said Letters Patent is hereby corrected as shown below:

Col. 25, claim 27, line 1, delete "video-on-demand system" and insert --method--.

Col. 26, claim 28, line 1, delete "video-on-demand system" and insert --method--.

Signed and Sealed this

Eleventh Day of March, 1997

Attest:

BRUCE LEHMAN

Attesting Officer

Commissioner of Patents and Trademarks